Figure 3:
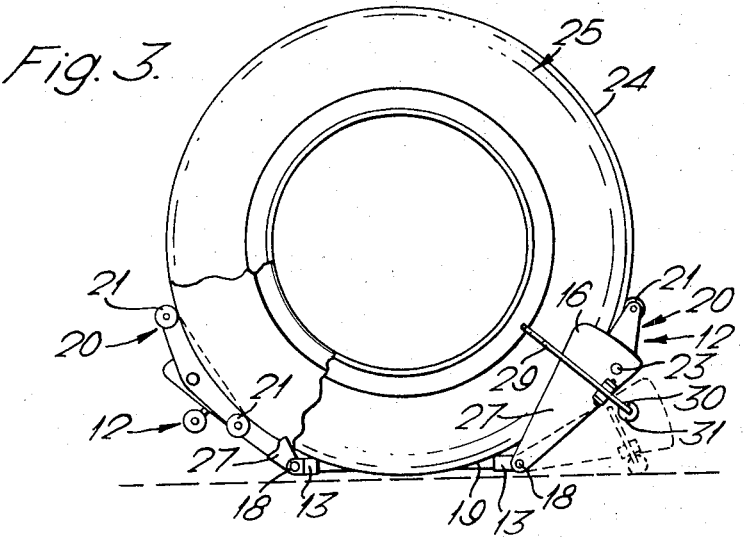

United States Patent [19]
Mott

[11] 3,830,388
[45] Aug. 20, 1974

[54] WHEEL MANIPULATOR

[76] Inventor: Daniel Badelier Mott, 160 The Esplanade, Burleigh Heads, Australia

[22] Filed: July 27, 1972

[21] Appl. No.: 275,592

[30] Foreign Application Priority Data
July 30, 1971  Australia............................ 5736/71

[52] U.S. Cl.................. 214/333, 214/331, 214/332, 214/620, 214/653
[51] Int. Cl........................................... B60b 29/00
[58] Field of Search .......... 214/330, 331, 332, 333, 214/334, 620, 650, 651, 652, 653, 654, 338, 339, 340; 105/215

[56] References Cited
UNITED STATES PATENTS

| | | | |
|---|---|---|---|
| 2,392,830 | 1/1946 | Baum................................... | 214/332 |
| 2,491,034 | 12/1949 | Couch.................................. | 214/333 |
| 2,883,858 | 4/1959 | Bishman.............................. | 214/340 |
| 2,903,049 | 9/1959 | Carlson................................ | 214/331 |
| 3,044,647 | 7/1962 | Hopfeld............................... | 214/652 |
| 3,409,156 | 11/1968 | Mills.................................... | 214/620 |

Primary Examiner—Robert J. Spar
Assistant Examiner—Lawrence J. Oresky
Attorney, Agent, or Firm—Allison C. Collard

[57] ABSTRACT

A wheel manipulator for handling extremely large wheel assemblies such as those fitted to Euclid type trucks, having a load carrying capacity of about one hundred tons and upwards, and usable for removing a wheel from and/or fitting a wheel onto a truck or the like. The wheel manipulator includes a main frame and a wheel supporting assembly connected thereto and provided with wheel engaging means which are operable to secure a wheel to the wheel supporting assembly. The wheel supporting assembly is selectively movable between a first position at which a wheel supported thereby has its normal axis of rotation horizontal and a second position at which a wheel supported thereby will have its normal axis of rotation vertical. In operation, a wheel may be removed from a truck by the wheel manipulator and transported thereby to a wheel press or the like. The wheel can then be selectively raised or lowered or tilted until its normal axis of rotation is vertical, for loading onto a wheel press.

6 Claims, 5 Drawing Figures

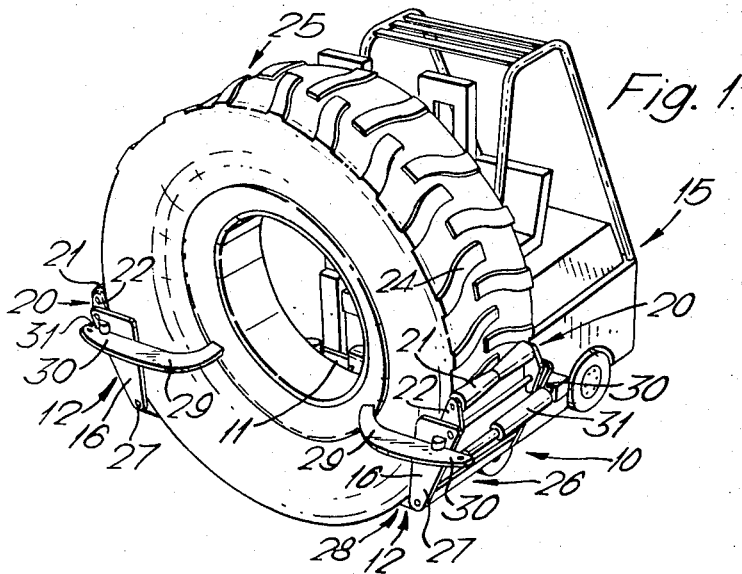

WHEEL MANIPULATOR

This invention relates to a new and improved wheel manipulator.

The invention has been devised to provide a wheel manipulator capable of handling extremely large wheel assemblies such as those fitted to "Euclid" type trucks having a load carrying capacity of, say, a hundred tons. In such vehicles, the overall diameter of each wheel may range in size up to nine feet diameter, and such wheels each weight about 4,000 pounds. At present, these types of wheels are removed from the trucks, repaired and replaced on to the trucks manually. Because of the time spent manipulating these extremely large and awkward wheel assemblies, the cost of each wheel changing operation is very high, and the trucks remain out of service for several days while the operation is performed.

It is therefore an object of this invention to provide a wheel manipulator which will enable wheel changing operations, on these types of vehicles, to be carried out quickly and easily and with a minimum of effort on the part of the operator. Yet another object of this invention is to provide such wheel manipulating apparatus which may be operated by one person, thus considerably reducing the present cost of wheel removal and replacement operations. Another object of this invention is to provide a wheel manipulator that will be efficient in operation and of robust construction. Other objects and advantages of the invention will hereinafter become apparent from the following description.

With the foregoing and other objects in view this invention resides broadly in a wheel manipulator for removing a wheel from and/or fitting a wheel on to a truck or the like, said wheel manipulator including a main frame and a wheel supporting assembly connected thereto and provided with wheel engaging means operable to secure a wheel to said wheel supporting assembly, the latter being selectively movable between a first position at which a wheel, when supported thereby, will be disposed with its normal axis of rotation horizontal and a second position at which said wheel will be disposed with its normal axis of rotation vertical.

Figure 5:
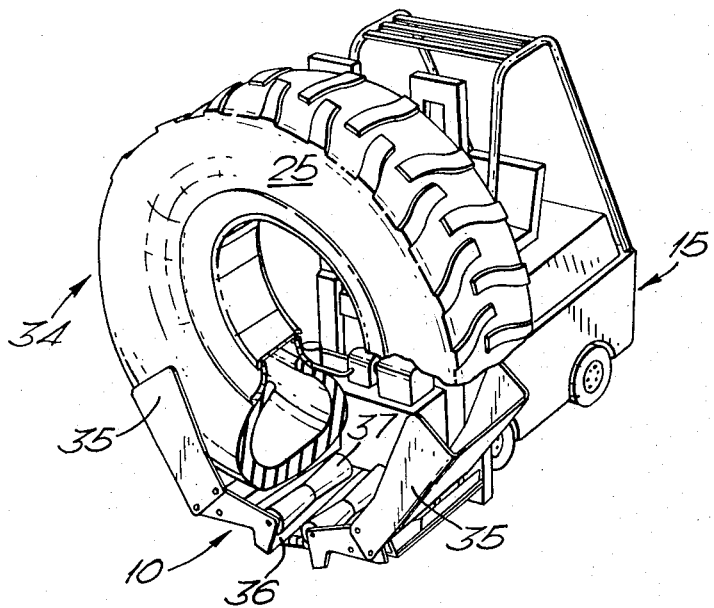
Figure 4:
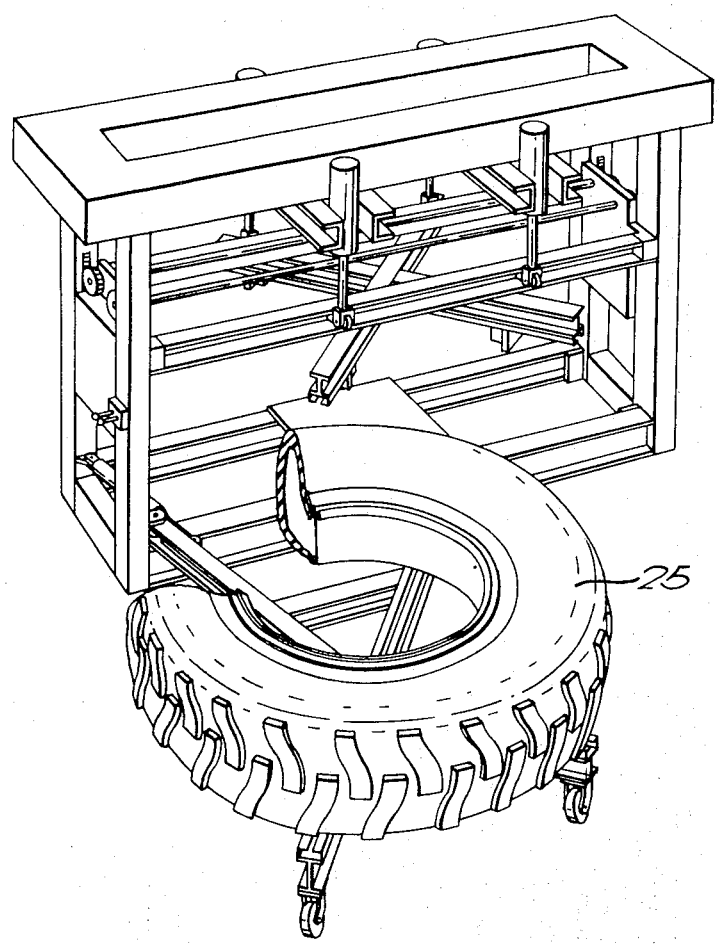

In order that the invention may be more readily understood and put into practical effect, reference will now be made to the accompanying drawings which illustrate a preferred embodiment of the invention wherein:

FIG. 1 is a perspective view of a wheel manipulator with a wheel supported thereon in its normal vertical position, FIG. 2 is a perspective view of the wheel manipulator with the wheel lowered to a horizontal position, FIG. 3 illustrates the action of the wheel engaging assemblies of the wheel manipulator illustrated in FIGS. 1 and 2, with part of the wheel cut away, FIG. 4 illustrates a wheel press for removing large tyres from their support rims, and FIG. 5 illustrates another embodiment of the invention.

Referring now to the drawings, there is shown a wheel manipulator 10 comprising a main frame assembly 11 having a pair of wheel support assemblies 12 mounted thereon for pivotal movement about a substantially horizontal axis. The main frame assembly 11 has a pair of box sectios 13 which are spaced apart and parallel and are adpated to be engaged about the load carrying forks 14 of a fork lift truck 15 which acts as a mobile transporter for the wheel manipulator 10 so that the wheel manipulator may be transported and raised and lowered, as required by the fork lift truck 15.

Each wheel supporting assembly 12 as shown, comprises a pair of triangular shaped side members 16 which are spaced apart a distance greater than the width of the wheel and they are connected together by an adjustable cross brace 17. The side member 16 pivot about an axle 18 fixed to a rigid support base 19, and they provide a pivotal mounting for each wheel supporting roller assembly 20 which has the function of a rocker assembly. The roller or rocker assemblies 20 each comprise a pair of inwardly tapering rollers 21 held in their operative position by a pair of end plates 22 which are connected pivotally about a transverse axle 23 located in the side members 16. These roller assemblies 20 are arranged to pivot freely about the axle 23 so that as the wheel supporting assemblies 12 are moved from their disengaged position, as shown in dotted outline in FIG. 3, to their engaged position, as shown in FIG. 3, the four rollers 21 will engage the outermost surface 24 of the tire wheel 25 and support it with its axis substantially horizontal. The wheel 25 can then be manually rotated about its axis by rolling it around on the rollers 21.

If the tire being manipulated has large voids between the upstanding portions of the block treads, which prevent their rotation on the roller assemblies 20, then the rollers 21 can be arranged in a staggered manner to ensure that the tire is at all times supported on the raised portions of the block tread. Preferably, the distance between the side members 16 is variable to allow the manipulator to be used with different sized wheels. In order to allow the wheel supporting assemblies 12 to be positioned operatively under the wheel 25 of a truck and raised to their operative position to enable the wheel to be removed, the side members 16 are fixed pivotally to a rigid support base 19 about their inner ends 27 and a pair of hydraulic rams 28 are connected therebetween to enable them to be selectively raised, or lowered in unison to enable them to pass beneath a wheel 25 mounted on a truck. Once the assemblies 12 are located directly therebeneath, the side members 16 are raised to engage about the lower portion of the wheel 25 as shown.

Also, a selectively operable extensible hydraulic ram (not shown) is fixed between the main frame assembly 11 and the rigid support base 19 to control the tilting of the wheel support assembly 12 with respect to a main frame 11, about a substantially horizontal axis adjacent the front portion 28 of the rigid support base 19. As illustrated, there are provided on each wheel supporting assembly 12 a pair of mutually co-operating wheel engaging members 29 each being connected pivotally to the side members 16 and being connected together at their outer ends 30 by an extensible hydraulic ram 31. This ram 31 is operable to pivot the members 29 from their engaged attitude as shown, to their disengaged attitude, so that the wheel 25 can be manually rotated about its axis on the rollers 21. This operation will normally only be necessary if the wheels to be removed and/or replaced are provided with bolt flanges which have to be aligned with bolts on the truck axle. A separate petrol internal combustion engine 32 is mounted on the main frame assembly 11 and it drives a hydraulic pump 33 which is also mounted on the main frame assembly 11 and which provides a pressurized oil supply for the abovementioned hydraulic rams.

In operation the wheel supporting assemblies 12 are located under the wheel to be removed, and for this purpose it is preferred that the manipulator 10 has a maximum reach of about five feet to enable it to reach under the inner wheel of a dual wheel arrangement. Once in position beneath the wheel to be removed, the wheel supporting assemblies 12 are raised until the rollers 21 engage the outer surface 24 of the tire 25. The wheel manipulator 10 is then raised by the fork lift truck until it supports the wheel 25. The mechanical fasteners, which fix the wheel to the truck, are then removed and the wheel is moved clear of the truck by reversing the fork lift 15 away from the truck, with the manipulator fixed thereto. The hydraulic rams 31 are then actuated to urge the wheel engaging members 29 to their engaged position and the ram (not shown) which tilts the sub-frame 26 is then actuated to lower the wheel 25 from its normal vertical position as shown in FIG. 1 to its horizontal position as shown in FIG. 2. The wheel 25 can then be raised or lowered as desired and transported to a wheel press of the type illustrated in FIG. 4, where the tire is removed and replaced from and on to the rim. Replacement of the wheel on to the truck is achieved by reversing the above operations.

In the embodiment 34, illustrated in FIG. 5, the wheel engaging means comprises a pair of channel shaped members 35 which engage about the wheel 25 and support it on the lower wheel supporting assembly 36. Preferably, the rollers 37 could be staggered to ensure free rolling of the tire assembly thereon or they could be arranged as shown. If the wheel manipulators as described above are to be used with a low capacity fork lift truck, then preferably a retractable type undercarriage is provided on the wheel manipulator to help support the weight of the wheel. Such an undercarriage assembly would preferably be hydraulically operated and have a vertical adjustment range sufficient to allow normal operation of the wheel manipulator. It will thus be seen that the task of removing and replacement of such wheels may be made much easier and that a considerable saving can be effected by using a wheel manipulator of the types illustrated above. Also, the wheel manipulator could be provided with its own self contained mobile transporter for raising and lowering the unit rather than being detachably secured to a fork lift truck.

While the above has been given by way of illustrative example it will of course be realised that many modifications of constructional detail and design may be made to the above described embodiment by persons skilled in the art without departing from the broad scope and ambit of the invention as is defined by the appended claims.

I claim:

1. A wheel manipulator for removing wheels from and fitting wheels onto wheeled vehicles and the like which comprises a main frame and a wheel supporting assembly connected thereto, said wheel supporting assembly being selectively movable between a first position in which it is adapted to support a wheel with the normal wheel axis of rotation substantially horzontal, wherein said wheel may be selectively rotated about said wheel axis, and a second position in which it is adapted to support said wheel with the wheel axis substantially vertical, said wheel supporting assembly including a pair of spaced roller assemblies arranged at opposite sides of a vertical plane through said normal wheel axis of a wheel supported thereby, each said roller assembly including a pair of spaced rollers disposed with their axes of rotation parallel to said normal wheel axis and mounted on a rocker assembly which is freely pivotable about an axis parallel to said roller axes and located intermediate therebetween to enable said rollers to move pivotally to an engaged position in contact with the periphery of a wheel supported thereby, and each said roller assembly being movable between said engaged position and a disengaged position in which said rollers are spaced outwardly therefrom, at least one of said pair of spaced roller assemblies having a wheel engaging means mounted thereon for movement therewith and selectively operable to engage opposite exposed side faces of the wheel to hold said wheel against the said one of said pair of spaced roller assemblies.

2. A wheel manipulator according to claim 1, wherein there is provided a connector assembly on the main frame for connecting said wheel manipulator to a raisable carriage of a mobile transporter whereby said manipulator may be selectively raised, lowered and transported by said mobile transporter.

3. A wheel manipulator according to claim 2, wherein said connector assembly is arranged so that the wheel manipulator can be releasably connected to the load carrying forks of a fork-lift truck, the latter then constituting said mobile transporter.

4. A wheel manipulator according to claim 1, wherein said wheel supporting assembly is connected pivotally to said main frame about a substantially horizontal axis for pivotal movement between said first position and said second position.

5. A wheel manipulator according to claim 4, wherein a hydraulic ram is connected between said wheel supporting assembly and said main frame and is operable to selectively tilt said wheel supporting assembly between said first position and said second position.

6. A wheel manipulator according to claim 1, wherein each said roller assembly is connected pivotally to one of a pair of parallel extending cantilever mounting beams rigid with said main frame, and the distance between said beams is sufficient to allow them to be positioned beneath a wheel on a vehicle when said roller assemblies are disposed in said disengaged positions.

* * * * *